United States Patent [19]

Moon et al.

[11] Patent Number: 5,701,369

[45] Date of Patent: Dec. 23, 1997

[54] FRACTAL IMAGE COMPRESSION DEVICE AND METHOD

[75] Inventors: Yong-Ho Moon; Jae-Ho Kim, both of Busan; Dong-Seek Park, Daegu, all of Rep. of Korea

[73] Assignee: SamSung Electronics Co., Ltd., Suwon, Rep. of Korea

[21] Appl. No.: 521,809

[22] Filed: Aug. 31, 1995

[30] Foreign Application Priority Data

Apr. 19, 1995 [KR] Rep. of Korea .................. 9252/1995

[51] Int. Cl.[6] ........................................ G06K 9/36
[52] U.S. Cl. .................................. 382/249; 382/235
[58] Field of Search ............................ 382/249, 248, 382/250; 358/432, 433, 235

[56] References Cited

U.S. PATENT DOCUMENTS

| | | | |
|---|---|---|---|
| 4,694,407 | 9/1987 | Ogden | 382/278 |
| 4,789,933 | 12/1988 | Chen et al. | 382/249 |
| 4,941,193 | 7/1990 | Barnsley et al. | 382/249 |
| 4,953,214 | 8/1990 | Takeguchi et al. | 348/409 |
| 5,065,447 | 11/1991 | Barnsley et al. | 382/249 |
| 5,148,497 | 9/1992 | Pentland et al. | 382/249 |
| 5,347,600 | 9/1994 | Barnsley et al. | 382/249 |
| 5,384,867 | 1/1995 | Barnsley et al. | 382/249 |
| 5,416,856 | 5/1995 | Jacobs et al. | 382/249 |
| 5,430,812 | 7/1995 | Barnsley et al. | 382/235 |

OTHER PUBLICATIONS

Jacquin, Fractal Image Coding: A Review, Oct. 1993, Proceedings of the IEEE, pp. 1451–1465.
Change et al., An Improved Scheme for Fractal Image Coding, Apr. 28 '95, Circuits and Systems, 1995. IEEE International Symposium, pp. 1624–1627.

Primary Examiner—Yon J. Couso
Attorney, Agent, or Firm—Robert E. Bushnell, Esq.

[57] ABSTRACT

A fractal image compression method performed in a digital image processing device includes the steps of: dividing image data representative of a composite image into a plurality of range blocks each having a first predetermined size; designating, for each of the range blocks, a plurality of domain blocks each having a second predetermined size, wherein each one of the plurality of domain blocks has a subportion that includes an entire portion of the corresponding range block; calculating coefficients of a contractive transformation function to match a plurality of spacially transformed domain blocks to each range block; calculating distortion errors between the range blocks and their corresponding pluralities of spacially transformed domain blocks; comparing the distortion errors among the spacially transformed domain blocks for each corresponding range block, and selecting a spacially transformed domain block having a minimum distortion error as a maximum similarity block for each corresponding range block; and storing, as a fractal code, a location index and coefficients of the contractive transformation function for each of the maximum similarity blocks.

36 Claims, 6 Drawing Sheets

FRACTAL IMAGE COMPRESSION DEVICE AND METHOD

CROSS-REFERENCE TO RELATED APPLICATIONS

This application makes reference to, incorporates the same herein, and claims all benefits accruing under 35 U.S.C. §119 from an application for *Fractal Image Compression Device And Method* earlier filed in the Korean Industrial Property Office on Apr. 19, 1995 and assigned Ser. No. 9252/1995.

BACKGROUND OF THE INVENTION

The present invention relates to a digital image compression device and method, and more particularly to a fractal image compression device and method.

In general, digital image compression methods can be classified into two distinct categories. With the first category, image data is transformed to a frequency domain, compressed and then reverse transformed. With the second category, image data is processed by sampling portions of the image and performing spatial transformations. The present invention is based on a digital image compression method from the second category. The present invention involves a fractal image compression method that approximates and expresses large quantities of image data using a mathematical model and its parameters in order to have a compression effect on the image data.

With fractal image compression theory, one assumes that the image to be compressed is a fractal image having the property of self-similarity as the spatial scale is changed over several orders of magnitude. The property of self-similarity can be seen with, for example, a rocky, jagged coastline which looks similar when seen from a jet airplane (a distance of 10 km), from a low altitude plane (100 m) and from a standing position (1 m). Accordingly, for purposes of image processing, a contractive transformation function using the fractal image as an attractor can be obtained, thus compressing the image. In the fractal image compression method, a composite image is divided into small range blocks, and domain blocks having dimensions similar to, but larger than, each range block are evaluated. Then, a contractive transformation function using the range block as an attractor is obtained, and the coefficients of the function are coded, thereby compressing the data represented in the range block.

The method of recovering a compressed fractal image begins with any arbitrary initial image and the original image is recovered by a repeated application of the fractal transformation function that is obtained by a compression process. The fractal image compression method, which is theoretically capable of a very high-level of compression (i.e. 1/10,000), is an unsymmetrical process having a much shorter recovery period than compression period. Therefore, the fractal image compression method is very useful in applications where high-speed image recovery is required.

Known methods embodying the fractal image compression method include Fisher's method, Jacquin's method and Monro's method. From these known fractal image compression methods, Fisher's method, for example, searches all of the domain blocks in an entire image in order to locate a domain block having the best self-similarity characteristics for each range block to be compressed. We note that in our opinion this process, however, has a disadvantage because compression of the image takes a long time since all of the domain blocks in the composite image must be searched for each range block.

Currently, an RIFS (Recurrent Iterated Function System) proposed by Barnsley et al. is being utilized as a fundamental fractal image compression scheme. This system is mentioned in U.S. Pat. No. 4,941,193 entitled *Methods And Apparatus For Image Compression By Iterated Function System*. In Barnsley et al. '193, an original or target image is subdivided into regions having similar characteristics. Contractive copies or maps of a particular region, which are the results of affine transforms to the region, are generated. The affine transform coefficients or RIFS codes are then stored and used to completely represent the input image. While this technique can generate highly compressed images, we believe that an improved technique exists for performing fractal image compression.

SUMMARY OF THE INVENTION

It is therefore an object of the present invention to provide an improved fractal image compression device and method.

It is another object to provide a fractal image compression device and method for reducing the time required to process an image.

It is still another object to provide a fractal image compression device and method for yielding a high data compression rate.

It is yet another object to provide a fractal image compression device and method for reducing the number of domain blocks to be searched and evaluated for similarity with a corresponding range block.

It is still yet another object to provide a fractal image compression device and method for detecting and evaluating (for self-similarity) only domain blocks that include and are located around each range block.

It is still a further object to provide a fractal image compression device and method which is capable of reducing the time required to process an image by detecting only-domain blocks located around each range block as self-similarity blocks and increasing the compression rate by reducing the number of parameters to be stored.

To achieve these and other objects, the present invention recognizes that for a given range block, the domain block having the most similarity often exists in regions that surround and include the range block. The present invention may be practiced by dividing image data representative of a composite image into a plurality of range blocks each having a first predetermined size; designating, for each of the range blocks, a plurality of domain blocks each having a second predetermined size, where each one of the plurality of domain blocks has a subportion that includes an entire portion of the corresponding range block; calculating coefficients (i.e., slope and offset values) of a contractive transformation function to match a plurality of spacially transformed domain blocks to each range block; calculating distortion errors between the range blocks and their corresponding pluralities of spacially transformed domain blocks; comparing the distortion errors among the spacially transformed domain blocks for each corresponding range block, and designating a domain block having a minimum distortion error as a maximum similarity block for each corresponding range block; and storing, as a fractal code, a location index and coefficients of the contractive transformation function for each of the maximum similarity blocks.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
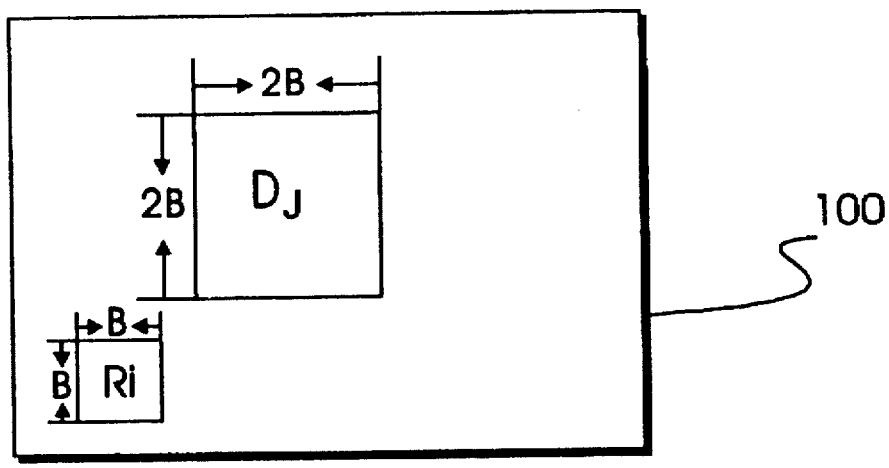
FIG. 1 is a diagram illustrating the designation of the range block (Ri) and the domain block (Dj) according to a first contemporary fractal image compression technique.

Turning now to the drawings and referring to FIG. 1, a diagram illustrating the designation of the range block (Ri) and the domain block (Dj) according to a first contemporary technique known as Fisher's fractal image compression method is shown. In FIG. 1, a composite image 100 is divided into non-overlapping range blocks (Pd) having a predetermined size, for example, B×B. Composite image 100 is also divided into overlapping domain blocks (Dj) having a predetermined size, for example, 2B×2B. With Fisher's method, all of the domain blocks (Dj) in the composite image 100 are evaluated for similarity with each range block (Ri). To assess these similarities, each domain block (Dj) is first reduced in size so that it is scaled into the applicable range block (Ri). The scaled domain block is then spacially transformed by eight different modes, thus obtaining coefficients of the transformation function of each case. Then, the transformation function coefficients, the mode of contractive transformation, and the location of the domain block (Dj) having the highest degree of similarity with the corresponding range block (Ri) are stored as a fractal code. These processes are repeated for all of the range blocks (Ri) in the composite image 100 so that a contractive transformation of the composite image 100 is obtained.

Since Fisher's method evaluates all of the domain blocks (Dj) in the composite image 100 for each range block (Ri) in order to compress the image, there is a disadvantage in that compression of the image takes a long time.

Figure 2:
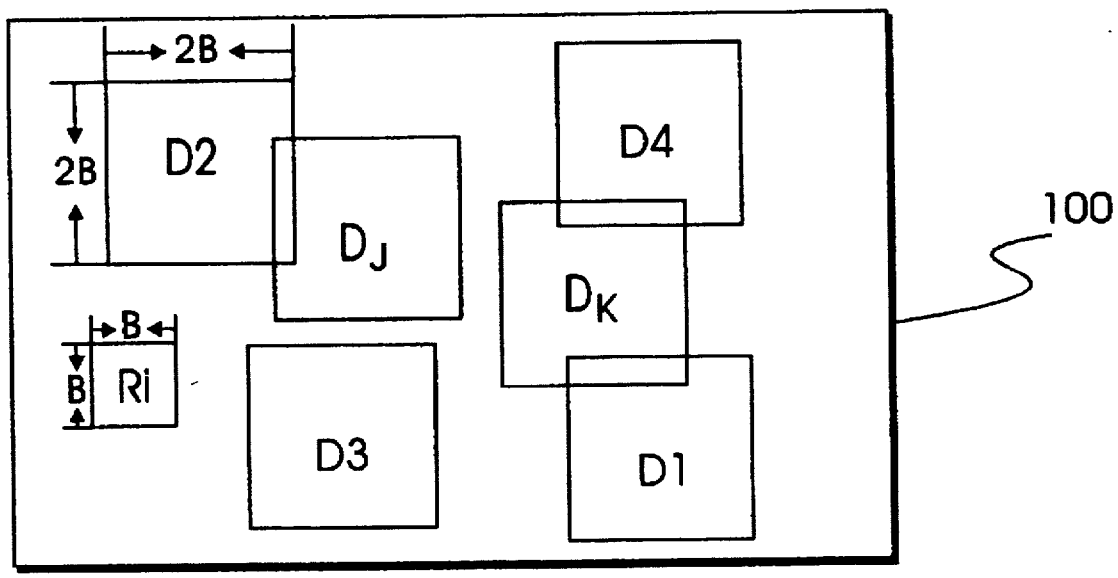
FIG. 2 is another diagram illustrating the designation of the range block (Ri) and the domain blocks (D1–D4) according to a second contemporary fractal image compression technique.

In order to solve this problem, a second contemporary technique known in the prior art as Jacquin's method classifies the domain blocks (Dj) and range blocks (Ri) of composite image 100 into several classes according to their attributes, as shown in FIG. 2. Therefore, only the domain blocks (D1–D4) belonging to the same class as the corresponding range block (Ri) to be compressed are evaluated. Thus, the domain blocks (Dj, Dk) not belonging to the same class are not evaluated. FIG. 2 is a diagram illustrating the designation of the range block (Ri) and the domain blocks (D1–D4) according to Jacquin's fractal image compression method.

Referring again to FIG. 2, when a range block (Ri), for example, belongs to the class corresponding to domain blocks D1–D4, fractal image compression is performed by comparing only the domain blocks (D1–D4) with the range block (Ri) for maximum similarity. That is, Jacquin's method classifies range blocks (Ri) into various Classes so that the number of comparisons between the domain blocks and a range block (Ri) is reduced and the compression period is thereby greatly shortened, as compared with Fisher's image compression method. We have learned that Jacquin's fractal image compression method, however, compared with other general image compression methods (e.g., JPEG) has a problem in that a long compression time is required.

Accordingly, the Fisher and Jacquin image compression methods have a disadvantage in that a long compression time is required and real-time processing is therefore impossible.

In order to reduce the long compression time required in evaluating the many domain blocks, a third technique known as Monro's image compression method defines a contractive transformation function having four coefficients and divides a composite image into non-overlapped domain blocks (2B×2B). Assuming that each of the domain blocks (Dj) includes four non-overlapping range blocks (B×B) (i.e. each domain block has a size four times larger than the size of a range block), contractive transformation functions are obtained by using each range block as an attractor. Accordingly, the four range blocks for a given domain block can be compressed in accordance with the transformation coefficients.

Monro's image compression method reduces the search period of the domain blocks and provides for a relatively short compression period, thus making real-time processing possible. When an image that has been compressed according to Monro's method is subsequently recovered, however, we have found that discontinuities between blocks can be observed, and that these discontinuities cause a deterioration in image quality. Also, in our opinion Monro's method has a disadvantage because the compression rate of the image is relatively low due to incrementing the number of coefficients.

Figure 3:
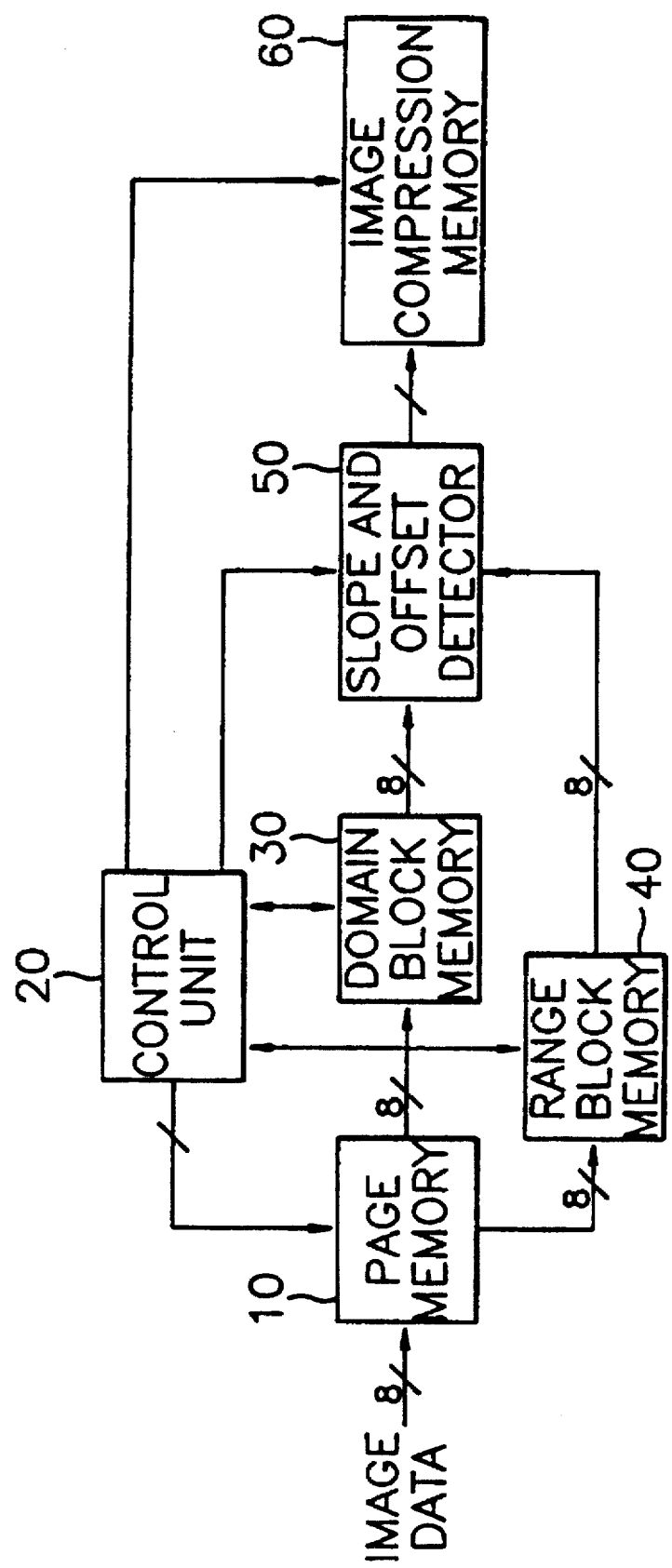
FIG. 3 is a block diagram illustrating a fractal image compression device constructed according to the principles of the present invention.

Referring now to FIG. 3, a block diagram of a fractal image compression device constructed according to the principles of the present invention is illustrated. A page memory 10 stores image data to be compressed. A range block memory 40 stores pixel data of the range blocks received from page memory 10. A domain block memory 30 stores pixel data of spacially-transformed domain blocks received from page memory 10. A slope and offset detector 50 calculates and outputs the slope and offsets of the contractive transformation function of a corresponding range block and each spacially-transformed domain block, and calculates and outputs a mean square error (MSE) between the corresponding range block and each spacially-transformed domain block. A control unit 20 loads the pixel data of the range blocks from page memory 10 into range block memory 40, and designates a plurality of domain blocks for each range block, where all of the domain blocks have a subportion that includes the entire range block.

Control unit 20 then spacially-transforms the domain blocks corresponding to each respective range block, and loads the spacially transformed domain blocks into domain block memory 30. Control unit 20 receives error values between the corresponding spacially transformed domain blocks and each respective range block from slope and offset detector 50, searches for the domain block for each range block that has a minimum error value, and enables output of the index of the location and the slope and offset values for the domain blocks having a minimum error value from slope and offset detector 50. An image compression memory 60 stores the index of the location and the slope and offset values of the contractive transformation function for the domain blocks having a minimum error value under the control of control unit 20.

Figure 4A:
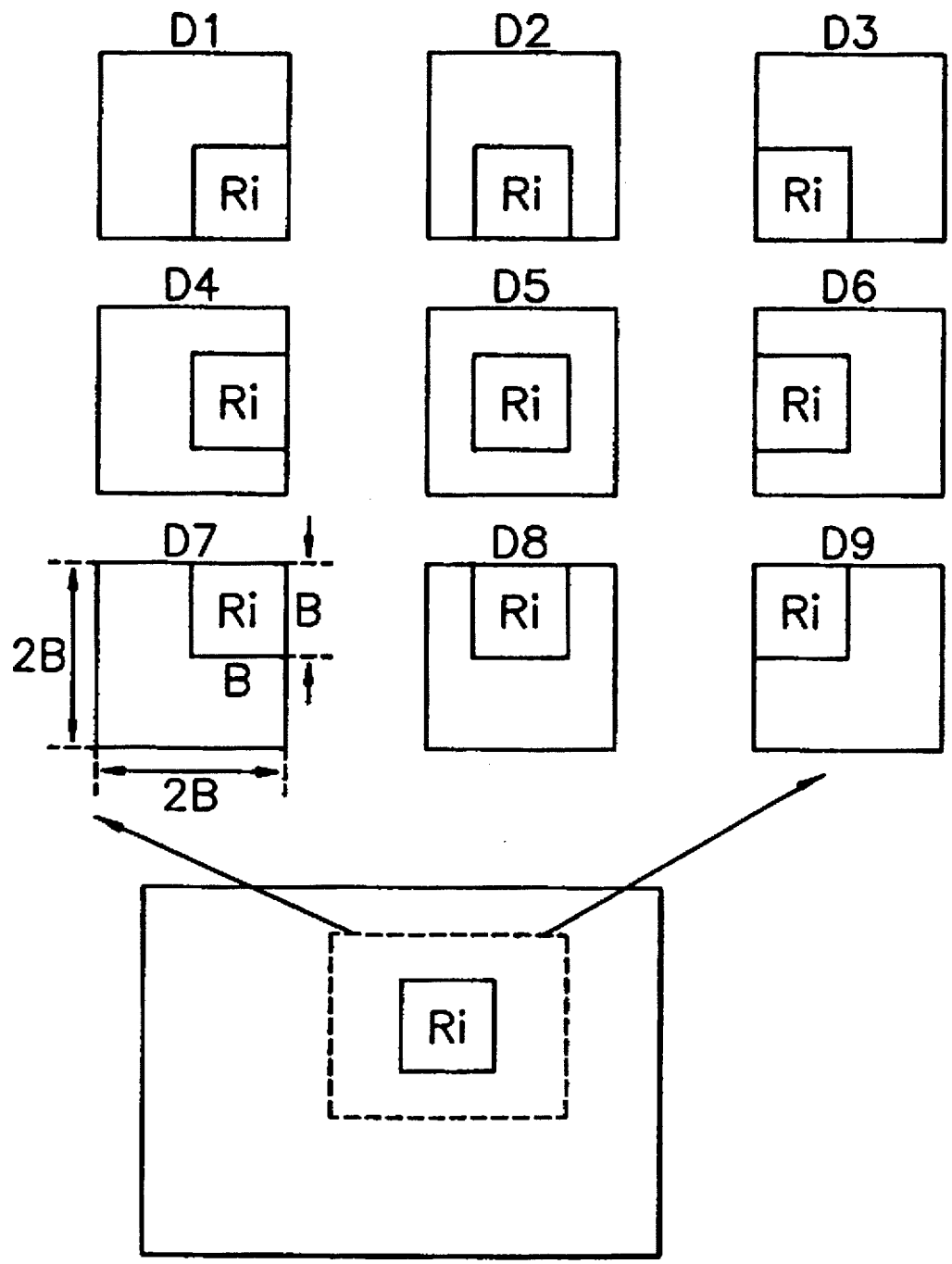
FIG. 4A is a diagram illustrating the designation of the ith range block (Ri) and nine domain blocks (D1–D9) arranged according to the principles of the present invention.
Figure 4B:
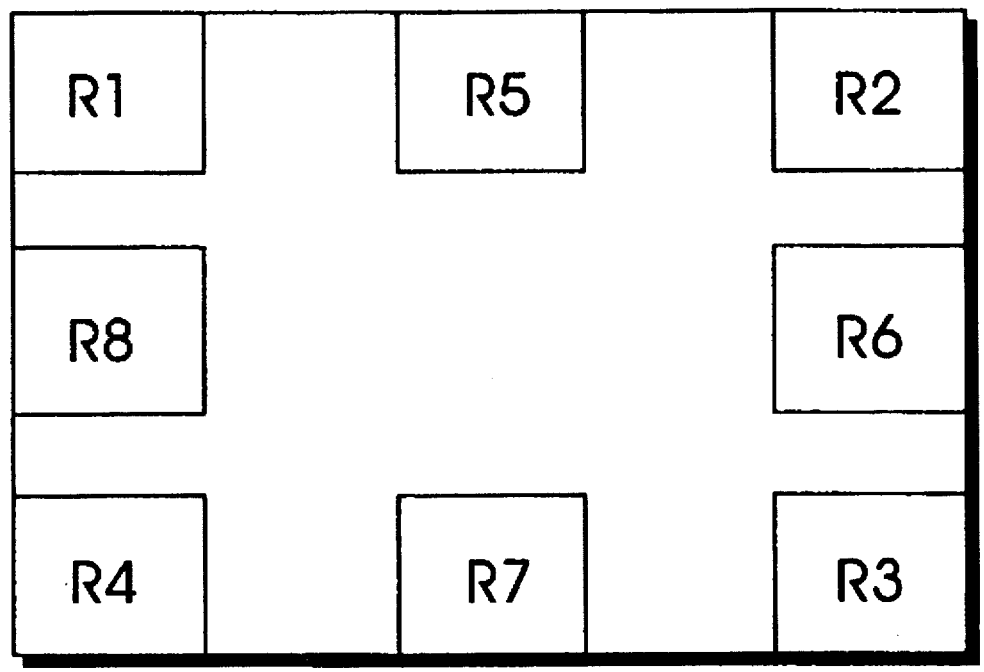
FIG. 4B is a diagram illustrating exemplary range blocks (R1–R8) positioned around the outer perimeter of a composite image according to the principles of the present invention.
Figure 5:
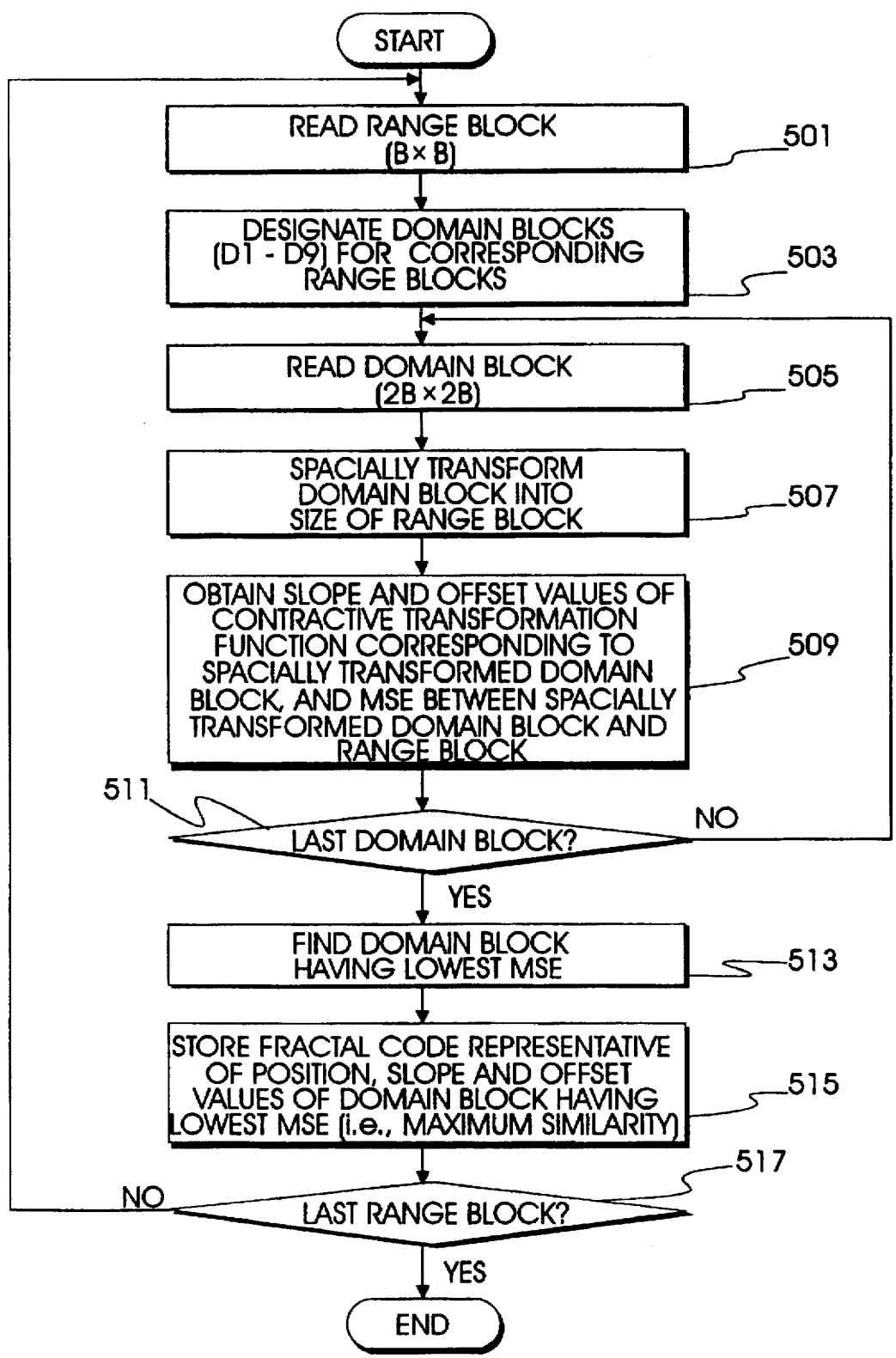
FIG. 5 is a flow chart illustrating a fractal image compression technique according to the principles of the present invention.

FIG. 4A is a diagram illustrating the designation of nine domain blocks (D1–D9) for the ith range block (Ri) arranged according to the principles of the present invention, FIG. 4B is a diagram illustrating exemplary range blocks (R1–R8) positioned around the outer perimeter of a composite image according to the principles of the present invention, while FIG. 5 is a flow chart illustrating the fractal image compression method performed by the device illustrated in FIG. 3 according to the principles of the present invention. With reference to FIGS. 3 through 5, a preferred embodiment of the present invention will now be discussed in detail.

In step 501, control unit 20 controls page memory 10 to read pixel data from the ith range block (Ri) and load the pixel data into range block memory 40. The ith range block (Ri) has a predetermined size, for example, B×B as is illustrated in FIG. 4, and represents a portion of the composite image. A plurality of such non-overlapping range blocks collectively represent a composite image. In step 503, control unit 20 designates nine domain blocks (D1–D9) that correspond to the ith range block (Ri). In the preferred embodiment, each of the nine domain blocks (D1–D9) has an area (2B×2B) four times larger than the area of each range block (Ri); however, it is recognized that the area of each domain block can also be selected as an integer multiple times the area of each range block. The nine domain blocks (D1–D9) are set up in accordance with the diagram in FIG. 4. That is, each of the nine domain blocks (D1–D9) has a subportion that includes the entire applicable range block (Ri). Accordingly, each of the nine domain blocks partially overlaps all of the other domain blocks. As seen from FIG. 4, for each domain block, the subportion of the domain block that includes the range block (Ri) is different. For example, domain block (D1) includes range block (Ri) in its lower right corner, while domain block (D9) includes range block (Ri) in its upper left corner. Other domain blocks, such as D4 and D6, include range block (Ri) in a central right portion and a central left portion, respectively.

Figure 6:
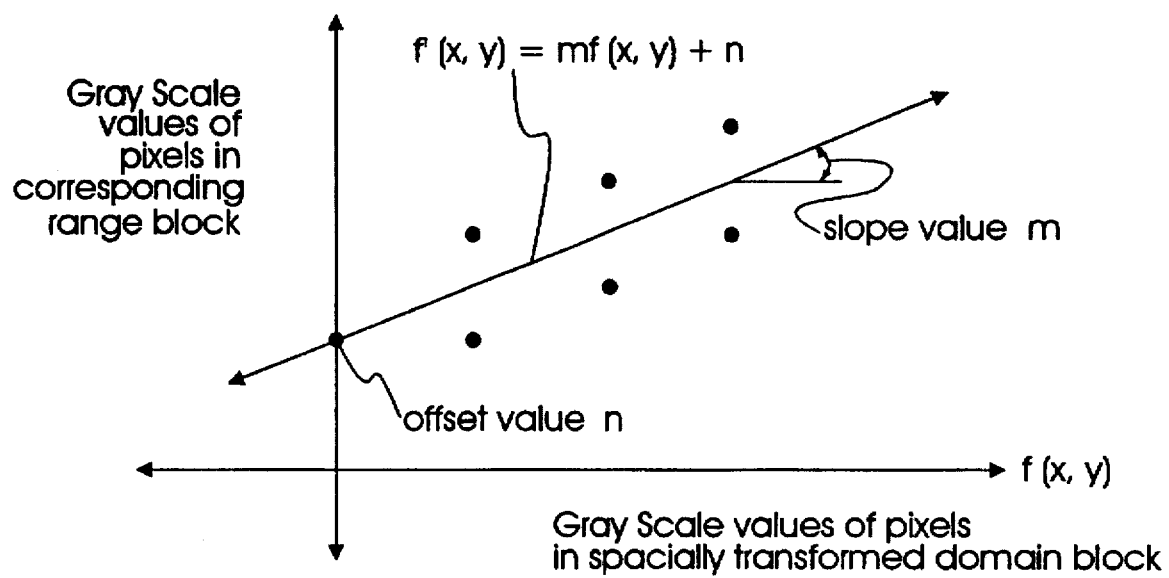
FIG. 6 is a two coordinate graph illustrating the relation between gray scale values of pixels in a spacially transformed domain block and gray scale values of pixels in a corresponding range block.

In step 505, control unit 20 controls page memory 10 to read pixel data from the first domain block (D1) and load the pixel data into domain block memory 30. In step 507, control unit 20 controls domain block memory 30 and spacially-transforms the domain block (D1) using a reduction ratio of ¼ so that all pixel data of the domain block (D1) corresponds one-to-one with the pixel data of range block (Ri). The results of this transformation are then output to slope and offset detector 50. In step 509, control unit 20 enables output of the pixel data of the range block (Ri) stored in range block memory 40 to slope and offset detector 50. Slope and offset detector 50 then calculates the slope and offset values of the contractive transformation function corresponding to domain block (D1), and calculates the mean square error (MSE) between the data of spacially transformed domain block (D1) and the data of range block (Ri). In regards to step 509, the contractive transformation function is the function of a straight-line equation. Therefore, the pixel data in the range block (Ri) to be compressed via the contractive transformation can be characterized by two coefficients, namely a slope value and an offset value. Referring now also to FIG. 6, when the contractive transform is performed upon a spacially transformed domain block using equation (1) below, only data representative of the slope value m (e.g., six bits) and data representative of the offset value n (e.g., ten bits) are generated.

$$f'(x,y) = mf(x,y) + n \tag{1}$$

When the range block is recovered using equation 1 during the recovery period (i.e., decompression process), in order to avoid divergence thereof, the following condition should be satisfied.

$$-1 < m < 1 \tag{2}$$

In equation (1), f (x, y) corresponds to gray scale values of pixels (x, y) in the spacially transformed domain block and f' (x, y) corresponds to gray scale values of pixels (x, y) in the corresponding range block. If the gray scale values of the spacially transformed domain block and corresponding range block are expressed as points in a two-dimensional plane, the graph of FIG. 6 can be obtained to provide slope and offset values, m and n.

There are generally two methods by which to obtain the slope and offset values m and n. The first method is based on trial and error and sets the slope value and then determines the offset value. The second method, known as the least square method, involves obtaining an optimal m and n under the mean square error (MSE) by utilizing a differential equation. A preferred embodiment of the present invention may use the latter way, which is a well known technology and accordingly can be incorporated into slope and offset detector 50.

In step 511, control unit 20 determines whether the domain block (D1) processed in steps 505–509 is a final domain block (i.e. D9) for the corresponding range block (Ri). Since domain block (D1) is not the final domain block for range block (Ri), the method loops back to step 503 where the next domain block (D2) is loaded into domain block memory 30 and processed in accordance with the above steps. Steps 505–509 are performed for each of the domain blocks (D1–D9) corresponding to the given range block (Ri). When the final domain block (D9) for the given range block (Ri) is processed, control unit 20 advances to step 513 and compares the mean square errors (MSE) between each of the spacially transformed domain blocks (D1–D9) and the corresponding range block (Ri) to find the domain block having the lowest mean square error. This domain block is selected as having the maximum degree of similarity to the corresponding range block (Ri). In step 515, control unit 20 stores as a fractal code in image compression memory 60, the slope and offset values of the contractive transformation function and the location index for the domain block having the maximum degree of similarity to the corresponding range block (Ri).

Then, in step 517, control unit 20 determines whether the range block (Ri) is the final range block in the composite image. If range block (Ri) is not the final range block, the method loops back to step 501, and the next range block is processed. This process is repeated for all of the range blocks in the composite image.

In the method described above, range blocks positioned around the outer perimeter of the composite image do not require consideration of all nine domain blocks (D1-D9) since portions of those domain blocks would exist outside of the composite image. Referring now to FIGS. 4A and 4B, an explanation of how range blocks (i.e., R1-R8) positioned around the outer perimeter of the composite image are processed will now be given. Assuming the same spacial orientation as domain blocks (D1-D9) shown in FIG. 4A, range block R1 considers only domain block D9, range block R2 considers only domain block D7, range block R3 considers only domain block D1, range block R4 considers only domain block D3, range block R5 considers only domain blocks D7, D8 and D9, range block R6 considers only domain blocks D1, D4 and D7, range block R7 considers only domain blocks D1, D2 and D3, and range block R8 considers only domain blocks D3, D6 and D9. Accordingly, those range blocks (R1-R8) positioned around the outer perimeter of the composite image are able to be processed quicker than those range blocks positioned near the central portion of the composite image.

In the present invention, one can optionally use eight bits to represent the slope value and eight bits to represent the offset value. In the preferred embodiment of the present invention, however, the slope value is represented as six bits and the offset value is represented as ten bits. These values are accordingly stored in image compression memory 60. Also, recovery of an image compressed via the process described above can be performed by a well-known fractal image recovery method.

As described above, a fractal image compression device and method practiced according to the principles of the present invention is advantageous in that real time processing is possible by reducing the number of the domain blocks to be evaluated for each range block. Moreover, image quality can be improved by reducing the discontinuity between range blocks.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A fractal image compression method, comprising the steps of:
    dividing image data representative of a composite image into a plurality of range blocks each having a first predetermined size;
    designating, for each one of said plurality of range blocks, a plurality of domain blocks each having a second predetermined size larger than said first predetermined size, each one of said plurality of domain blocks having a subportion that includes an entire portion of a corresponding range block;
    calculating, for each one of said plurality of range blocks, coefficients of a contractive transformation function to match each one of said plurality of domain blocks to said corresponding range block;
    calculating, for each one of said plurality of range blocks, errors between each one of said plurality of domain blocks and said corresponding range block;
    selecting, for each one of said plurality of range blocks, one of said plurality of domain blocks having a minimum error as a maximum similarity block for said corresponding range block; and
    storing, for each one of said plurality of range blocks, a location index and said coefficients of said contractive transformation function for said one of said plurality of domain blocks selected as said maximum similarity block for said corresponding range block.

2. The fractal image compression method as claimed in claim 1, wherein said step of calculating said coefficients of said contractive transformation function further comprises spacially transforming, for each one of said plurality of range blocks, each one of said plurality of domain blocks to contain a same amount of said image data as said corresponding range block.

3. The fractal image compression method as claimed in claim 1, wherein said step of calculating said errors comprises calculating mean square errors between each of said plurality of domain blocks and said corresponding range block.

4. The fractal image compression method as claimed in claim 1, wherein nine domain blocks are designated for each one of said plurality of range blocks in said designating step.

5. The fractal image compression method as claimed in claim 1, wherein said second predetermined size is an integer multiple larger than said first predetermined size.

6. The fractal image compression method as claimed in claim 5, wherein said integer multiple equals four.

7. The fractal image compression method as claimed in claim 2, wherein nine domain blocks are designated for each one of said plurality of range blocks in said designating step.

8. The fractal image compression method as claimed in claim 2, wherein said second predetermined size is an integer multiple larger than said first predetermined size.

9. The fractal image compression method as claimed in claim 8, wherein said integer multiple equals four.

10. A fractal image compression method, comprising the steps of:
    storing image data representative of a composite image to be compressed in a memory;
    dividing said image data into a plurality of range block each having a first predetermined size;
    designating, for each one of said plurality of range blocks, a plurality of domain blocks each having a second predetermined size that is an integer multiple larger than said first predetermined size, each one of said plurality of domain blocks having a subportion that includes an entire portion of a corresponding range block;
    spacially-transforming, for each one of said plurality of range blocks, each one of said plurality of domain blocks to contain a same amount of said image data as said corresponding range block;
    calculating, for each one of said plurality of range blocks, coefficients of a contractive transformation function to match each one of said plurality of domain blocks to said corresponding range block;
    calculating, for each one of said plurality of range blocks, mean square errors between each one of said plurality of domain blocks and said corresponding range block;
    selecting, for each one of said plurality of range blocks, one of said plurality of domain blocks having a minimum error as a maximum similarity block for said corresponding range block; and storing, for each one of said plurality of range blocks, a location index and said coefficients of said contractive transformation function for said one of said plurality of domain blocks selected as said maximum similarity block for said corresponding range block.

11. The fractal image compression method as claimed in claim 10, wherein nine domain blocks are designated for each one of said plurality of range blocks in said designating step.

12. A fractal image compression device, comprising:

first storing means for storing pixel data to be compressed, said pixel data representative of a composite image;

second storing means for receiving from said first storing means portions of said pixel data corresponding to a range block divided from said composite image, and for storing said portions of said pixel data corresponding to said range block;

third storing means for receiving from said first storing means portions of said pixel data corresponding to a plurality of domain blocks assigned to said range block, and for storing said portions of said pixel data corresponding to said plurality of domain blocks;

means for calculating and outputting coefficients of a contractive transformation function between said range block and each one of said plurality of domain blocks, and for calculating and outputting mean square errors between said portions of said pixel data corresponding to said range block and said portions of said pixel data corresponding to each one of said plurality of domain blocks;

control means for assigning said plurality of domain blocks from said composite image to said range block so that each one of said plurality of domain blocks has a subportion that includes an entire portion of said range block, generating a plurality of spacially transformed domain blocks by transforming each one of said plurality of domain blocks to spacially correspond to said range block, receiving said mean square errors, selecting one of said plurality of domain blocks having a minimum mean square error as a most similar domain block, and then enabling output of a location index and said coefficients of said contractive transformation function corresponding to said most similar domain block; and fourth storing means for storing as a fractal code, said location index and said coefficients of said contractive transformation function corresponding to said most similar domain block.

13. The fractal image compression device as claimed in claim 12, wherein said plurality of domain blocks comprises nine domain blocks.

14. The fractal image compression device as claimed in claim 13, wherein said range block has a first predetermined size and each one of said plurality of domain blocks has a second predetermined size, said second predetermined size being an integer multiple larger than said first predetermined size.

15. The fractal image compression device as claimed in claim 14, wherein said integer multiple equals four.

16. The fractal image compression device as claimed in claim 12, wherein said range block has a first predetermined size and each one of said plurality of domain blocks has a second predetermined size, said second predetermined size being an integer multiple larger than said first predetermined size.

17. The fractal image compression device as claimed in claim 16, wherein said integer multiple equals four.

18. A fractal image compression method, comprising the steps of:

dividing image data representative of a composite image into a plurality of range blocks each having a first predetermined size;

selecting, for each one of said plurality of range blocks, nine overlapping domain blocks each having a second predetermined size, each one of said nine domain blocks having a subportion that encompasses an entire portion of a corresponding range block, transforming, for each one of said plurality of range blocks, each one of said plurality of domain blocks to correspond spacially with said corresponding range block;

calculating, for each one of said plurality of range blocks, coefficients of a contractive transformation function to match each one of said plurality of domain blocks to said corresponding range block;

calculating, for each one of said plurality of range blocks, mean square errors between each one of said plurality of domain blocks and said corresponding range block;

selecting, for each one of said plurality of range blocks, one of said plurality of domain blocks having a minimum error as a maximum similarity block for said corresponding range block; and storing, for each one of said plurality of range blocks, a location index and said coefficients of said contractive transformation function for said one of said plurality of domain blocks selected as said maximum similarity block for said corresponding range block.

19. The fractal image compression method as defined in claim 18, wherein a first of said nine domain blocks has a lower right subportion that encompasses said corresponding range block, a second of said nine domain blocks has a lower center subportion that encompasses said corresponding range block, a third of said nine domain blocks has a lower left subportion that encompasses said corresponding range block, a fourth of said nine domain blocks has a central right subportion that encompasses said corresponding range block, a fifth of said nine domain blocks has a center subportion that encompasses said corresponding range block, a sixth of said nine domain blocks has a central left subportion that encompasses said corresponding range block, a seventh of said nine domain blocks has a upper right subportion that encompasses said corresponding range block, an eighth of said nine domain blocks has an upper center subportion that encompasses said corresponding range block, and a ninth of said nine domain blocks has an upper left subportion that encompasses said corresponding range block.

20. The fractal image compression method as defined in claim 19, wherein said second predetermined size is an integer multiple larger than said first predetermined size.

21. The fractal image compression method as defined in claim 20, wherein said integer multiple equals four.

22. An image compression device, comprising:

first means for storing pixel data to be compressed, said pixel data representative of a composite image, said pixel data comprising portions of said pixel data corresponding to a range block divided from said composite image and portions of said pixel data corresponding to a plurality of domain blocks assigned to said range block;

means for calculating and outputting coefficients of a contractive transformation function between said range block and each one of said plurality of domain blocks, and for calculating and outputting mean square errors between said portions of said pixel data corresponding to said range block and said portions of said pixel data corresponding to each one of said plurality of domain blocks;

control means for assigning said plurality of domain blocks from said composite image to said range block so that each one of said plurality of domain blocks has a subportion that includes an entire portion of said range block, generating a plurality of transformed domain blocks by transforming each one of said plurality of domain blocks to spacially correspond to said range block, receiving said mean square errors, selecting one of said plurality of domain blocks having a minimum mean square error as a most similar domain block, and then enabling output of a location index and said coefficients of said contractive transformation function corresponding to said most similar domain block; and said first means for storing said location index and said coefficients of said contractive transformation function corresponding to said most similar domain block.

23. The image compression device as claimed in claim 22, wherein said plurality of domain blocks comprises nine domain blocks.

24. The image compression device as claimed in claim 23, wherein said range block has a first predetermined size and each one of said plurality of domain blocks has a second predetermined size, said second predetermined size being an integer multiple larger than said first predetermined size.

25. The image compression device as claimed in claim 24, wherein said integer multiple equals four.

26. The image compression device as claimed in claim 22, wherein said range block has a first predetermined size and each one of said plurality of domain blocks has a second predetermined size, said second predetermined size being an integer multiple larger than said first predetermined size.

27. The image compression device as claimed in claim 26, wherein said integer multiple equals four.

28. The image compression device as claimed in claim 22, wherein said means for calculating comprises a slope and offset detector for detecting slopes and offsets.

29. The image compression device as claimed in claim 22, wherein said means for calculating obtains slope values of said pixel data before obtaining offset values of said pixel data.

30. The image compression device as claimed in claim 22, wherein said means for calculating detects slope and offset values of said pixel data.

31. The fractal image compression method of claim 1, wherein:

for each one of said plurality of range blocks, said first predetermined size is equal to said first predetermined size for every other one of said plurality of range blocks; and for each one of said plurality of domain blocks, said second predetermined size is equal to said second predetermined size for every other one of said plurality of domain blocks.

32. A fractal image compression method, comprising the steps of:

obtaining a contractive transformation function for each one of a plurality of range blocks, wherein said plurality of range blocks is a partition of an image represented by image data to be compressed, each one of said plurality of range blocks has corresponding thereto a plurality of domain blocks with each one of said plurality of domain blocks having a subportion that includes an entirety of said range block, and said obtaining step includes for each one of said plurality of range blocks spacially transforming a portion of said image data into a portion of pixel data for each one of said plurality of domain blocks, with said portion of said image data representing said domain block, calculating a slope and an offset for each one of said plurality of domain blocks, with said slope and said offset defining a contractive transformation function mapping said portion of said image data onto said portion of pixel data, calculating a mean square error between said portion of pixel data and said portion of said image data for each one of said plurality of domain blocks, and selecting one of said plurality of domain blocks as a maximum-similarity domain block for said range block, with said mean square error for said maximum-similarity domain block constituting a minimum among said mean square errors for said plurality of domain blocks; and storing physical quantities representative of a location index corresponding to said maximum-similarity domain block and of said slope and said offset for said maximum-similarity block in an image compression memory for each one of said plurality of range blocks.

33. The fractal image compression method of claim 32, further comprising the steps of:

storing said image data in a page memory; and dividing said image into said plurality of range blocks.

34. The fractal image compression method of claim 32, wherein said obtaining step further includes designating said plurality of domain blocks corresponding to said range block.

35. The fractal image compression method of claim 33, wherein said obtaining step further includes:

loading said portion of said image data into a range block memory;

loading said portion of pixel data into a domain block memory for each one of said plurality of domain blocks; and outputting said physical quantities representative of said location and said slope and said offset for said maximum-similarity block.

36. The fractal image compression method of claim 35, wherein said obtaining step further includes:

outputting said slope and said offset for each one of said plurality of domain blocks; and outputting said mean square error between said portion of pixel data and said portion of said image data for each one of said plurality of domain blocks.

* * * * *